United States Patent [19]
Schultz

[11] 3,760,427

[45] Sept. 25, 1973

[54] SURGICALLY IMPLANTABLE PROSTHETIC JOINT

[76] Inventor: Robert Jordan Schultz, 64 Little Brook Rd., Wilton, Conn.

[22] Filed: Mar. 24, 1972

[21] Appl. No.: 237,856

[52] U.S. Cl............................ 3/1, 128/92 C, 287/12, 287/21, 287/87
[51] Int. Cl. ................................................ A61f 1/24
[58] Field of Search............................. 3/1, 22, 27; 128/92 C, 92 CA, 92 R; 287/12, 21, 87

[56] References Cited
UNITED STATES PATENTS

| | | | |
|---|---|---|---|
| 3,694,821 | 10/1972 | Moritz | 3/1 |
| 3,506,982 | 4/1970 | Steffee | 3/1 |
| 3,656,186 | 4/1972 | Dee | 3/1 |

OTHER PUBLICATIONS
"Factors in the Design of an Artificial Hip Joint" by J. Charnley, Proceedings The Institute of Mechanical Engineers, Vol. 181, Part 3J, 1966–67, pages 109–111.

Primary Examiner—Richard A. Gaudet
Assistant Examiner—Ronald L. Frinks
Attorney—James M. Heilman et al.

[57] ABSTRACT

A prosthetic joint for the replacement of the metacarpophalangeal and the interphalangeal joints of the hand, and for the knee. The joint includes a ball secured to the distal bone by an intramedullary stem and cylindrical cavity element to receive the ball secured to the proximal bone, also by an intramedullary stem. The cylindrical cavity element is provided with an entrance means so that the joint may be assembled and the stems secured to the two bones.

4 Claims, 9 Drawing Figures

PATENTED SEP 25 1973 3,760,427

SURGICALLY IMPLANTABLE PROSTHETIC JOINT

BACKGROUND OF THE INVENTION

This invention relates to endoprosthetic joints and has particular reference to joints implanted in the body of a human being or animal which can be assembled without special tools and which can be forced together by a moderate amount of pressure. The prosthetic joints are ball and socket arrangements for movement through many degrees of freedom, or they may be restricted to a single, or two, planes of motion.

Prosthetic joints have been used to replace defective natural joints in humans and animals, such joints generally made similar to a hinge, some having screw means for securing a bolt or pin to two end portions. Such arrangements require special tools for assembly and, after joining, present sharp edges to the enclosing soft tissues. Others are of a soft silastic material which acts as a filler, and at times, working as a hinge. One of the features of this invention is to restore a somewhat "condylar motion" to the joint which is the more natural type of motion rather than a hinge mechanism.

Another feature of the present invention is the ease with which the joint elements are attached to each other during surgery. The two elements are attached to the bones via intramedullary stems, and then the enlargement, i.e. ball of one element is simply pushed into the cylindrical or other shaped cavity of the other element, relying upon the basic anatomy of bone and soft tissues plus the ball and socket arrangement to hold the two elements in condylar relationship. After the ball enlargement is positioned in the channel cavity, the stem 12 is forced into the medullary canal whereby the overhanging bone structure closes off the top of the channel (see FIG. 2).

Another feature of the invention is the minimal exposure of sharp points, edges, and protruding elements which might cause damage to the surrounding soft tissue. This is accomplished by having an offset stem such that the head of the metacarpophalangeal component can be buried beneath the ledge of bone.

Another feature is an extension guard (20) to limit extension of the joint from exceeding the neutral position, and to prevent the ball from being dislodged from the socket element by tilting the ball downwardly as in a see-saw action.

Another feature of the invention is that there is an attempt to restore "condylar motion" in flexion and extension which more closely resembles the normal joint motion.

For a better understanding of the present invention, together with other details and features thereof, reference is made to the following description taken in connection with the accompanying drawings.

DESCRIPTION OF THE PREFERRED EMBODIMENT

Figure 1:
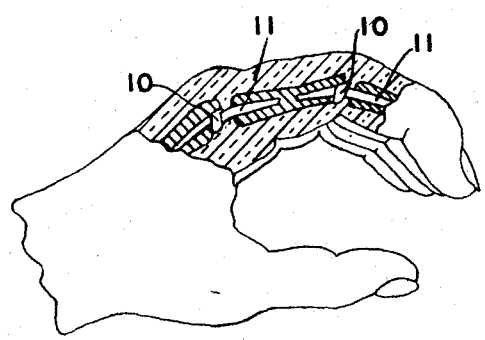
FIG. 1 is a side view of the hand, with some parts in section showing several prosthetic joints installed in the metacarpophalangeal and proximal interphalangeal joints.
Figure 2:
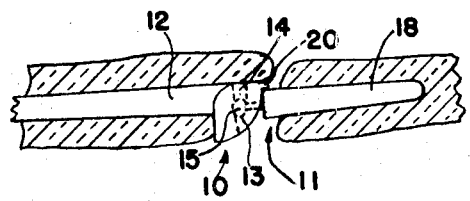
FIG. 2 is a side view of one of the joints shown in FIG. 1.

Referring now to the figures, the joint comprises a socket element 10 and a ball element 11. The socket element 10 includes an offset intramedullary stem 12 which is inserted into the medullary canal of the bone for permanently securing one end of the joint. The socket element 10 also includes a cylindrical or other shaped channel 14 terminated by a curved or spherical surface 13. One end of the channel is open to provide an entrance for an enlargement or ball proper 15 secured to the ball element 11 by a reduced diameter cylindrical neck 16. Channel 14 adjoins slot 17. The slot 17 is narrower than channel 14 whereby to retain ball 15 in channel 14 and thus provide "condylar motion" as neck 16 moves along slot 17. The slot 17 can be wider than the diameter of the neck 16 to provide a limited second degree of motion to the distal portion of the joint. The ball element 11 also includes an intramedullary stem to enter the medullary canal of the distal bone. While neck 16 and ball 15 may be centrally positioned on the end of intramedullary stem 18, it may preferably be offset slightly toward the top of the latter stem as can be seen in the modification illustrated in FIG. 5A as mentioned later.

Figure 4:
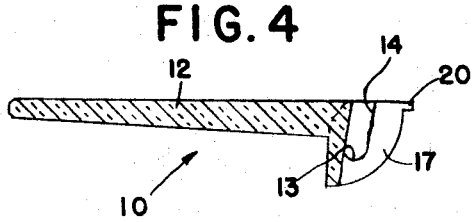
FIG. 4 is a cross sectional view of the socket or channel portion of FIG. 2. This section is taken along a vertical median plane of that figure.
Figure 3:
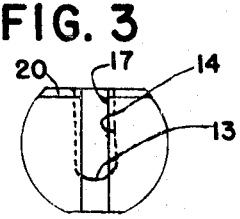
FIG. 3 is an end view of the cylindrical cavity portion of the joint shown in FIG. 2. In this view the enlarged portion has been removed.

During the assembly of the joint, the ball 15 is entered at the top of the channel 14, after which the ball is then free to move up and down within the limit of channel 14. A small extension 20 is provided at the upper surface of the socket element to restrict the hyperextension of the joint (FIG. 4). The type of joint described above gives the patient freedom of movement. However, the joint permits a more specialized movement resembling the motion of a bony condyle. The ball has freedom of motion in extension and flexion within the cylinder 14 to effect "condylar motion" to compensate for the unequal distance in the horizontal and vertical axes of the normal condyle.

Both portions of the joint may be made of stainless steel or plastic such as high molecular weight polyethylene but the preferred materials are an ultra high molecular weight polyethylene for the proximal component i.e., socket element 10, and a nonreactive metal, such as stainless steel, for the distal component i.e., the assembly 11.

Before the stems 12 and 18 are entered into the bone canals, a cavity forming tool with raised rasp portions having the same dimensions as the intramedullary stems is employed to form a channel in the bone.

Figure 8:
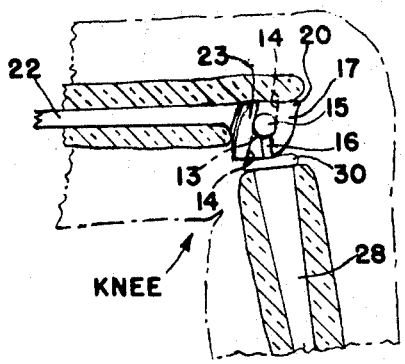
FIG. 8 is a side view of a ball and socket joint applied to the knee. This is an alternate form with reinforcements added to permit the weight of the upper portion of the body to be supported by the joint and the attached bone structure.
Figure 7:
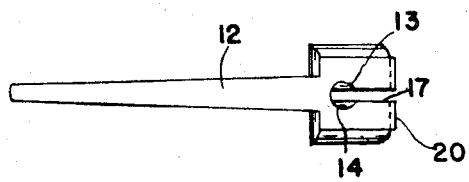
FIG. 7 is a top view of the cylindrical cavity portion of the joint.

The joint shown in FIG. 8 is a slightly modified form for the knee and comprises a proximal socket portion with an intramedullary stem 22 and an end portion 23 in firm contact with the end of the bone. End portion 23 receives the ball 15 of the distal component. This end portion is made of high molecular weight polyethylene and includes the cylindrical opening 14 and the slot 17 as described above. The distal portion of the joint is the same as described above except that the stem 28 is formed with an enlarged ridge 30 which provides a broader contact base for the distal bone to support the weight of the body when the patient is in a standing position for a firm weight sustaining contact is necessary between the joint and the bone structure.

Figure 6:
FIG. 6 is an end view of the ball portion of the joint with the ball in the midline.
Figure 5:
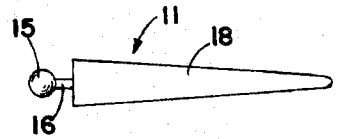
FIG. 5 is a top view of the ball enlargement portion of the joint.
Figure 5A:
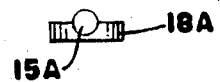
FIG. 5A is an end view of the enlarged portion of the ball component with the ball offset from the axis of the stem and the bearing portion of the stem formed with a concave surface.

As mentioned above, referring to FIGS. 5 and 6 the cylindrical neck 16 with the ball 15 could be offset from the center of the base stem 18 instead of being centrally located both vertically and horizontally. The preferred offset position would be toward the top portion as seen in FIG. 5A whereby optimum results have been achieved in certain cases. Likewise, the forward or thick end of the base stem 18, at cylindrical neck 16, in its long direction as illustrated by 18A may be curved, being slightly concave in relation to ball 15A instead of being perfectly flat. Instead of a ball or sphere 15, and a cylindrical channel or socket 14, other types of enlarged areas and geometrical shapes obviously may be used as long as the two parts are compatible and coact together. Many other modifications and equivalents are readily apparent, all of which are included herein.

The embodiment of the invention in which an exclusive property or privilege is claimed are defined as follows:

1. An implantable prosthetic joint of the ball and socket type comprising: a first element including an intramedullary stem for affixing said element into the medullary canal of the bone, a neck portion of reduced diameter at one end of the stem, and a ball secured to the neck portion and being of greater diameter than said neck portion; a socket element including a second intramedullary stem having a longitudinal axis for affixing said socket element in another bone portion, a ball retaining means on the socket element and including an elongated cylindrical channel extending transverse to said longitudinal axis retaining the ball while providing rotational pivoting and linear motion of the ball, said channel being of uniform diameter along a major portion of its length and terminating at one side of the retaining means in a hole having a diameter at least equal to said ball where the ball is entered when first assembled, an elongated slot intersecting said channel slidably receiving said neck portion, said slot being narrower than said channel and an extension at said one side of the ball retaining means for limiting the pivoting motion of the first element.

2. A prosthetic joint as claimed in claim 1 wherein said neck portion is formed of integral one-piece construction with the ball and intramedullary stem.

3. A prosthetic joint as claimed in claim 1 wherein the socket element of the joint is made of a plastic material such as polyethylene and the ball portion of the joint is made of a nonreactive material such as stainless steel.

4. A prosthetic joint for the hand as claimed in claim 1 wherein the slot is wider than the diameter of the neck to provide a limited second degree of motion to the distal portion of the joint.

* * * * *